US012038018B2

(12) United States Patent
Sato et al.

(10) Patent No.: US 12,038,018 B2
(45) Date of Patent: Jul. 16, 2024

(54) BLOWER

(71) Applicants: CAP CO., LTD., Kanagawa (JP);
OSAKA BLOWER MFG. CO., LTD.,
Osaka (JP)

(72) Inventors: Kimihiko Sato, Kanagawa (JP);
Makoto Kawauchi, Osaka (JP); Hiroki Nagano, Osaka (JP)

(73) Assignees: CAP CO., LTD.; OSAKA BLOWER MFG. CO., LTD.

( * ) Notice: Subject to any disclaimer, the term of this patent is extended or adjusted under 35 U.S.C. 154(b) by 217 days.

(21) Appl. No.: 17/594,998

(22) PCT Filed: Mar. 2, 2021

(86) PCT No.: PCT/JP2021/007961
§ 371 (c)(1),
(2) Date: Nov. 4, 2021

(87) PCT Pub. No.: WO2021/177307
PCT Pub. Date: Sep. 10, 2021

(65) Prior Publication Data
US 2022/0213899 A1    Jul. 7, 2022

(30) Foreign Application Priority Data

Mar. 2, 2020 (JP) ................. 2020-035041

(51) Int. Cl.
*F04D 29/42* (2006.01)
*F04D 17/10* (2006.01)
(Continued)

(52) U.S. Cl.
CPC ....... *F04D 29/4206* (2013.01); *F04D 29/053* (2013.01); *F04D 29/056* (2013.01);
(Continued)

(58) Field of Classification Search
CPC .... F04D 29/4206; F04D 17/08; F04D 29/053; F04D 29/056; F04D 29/059; F04D 29/10;
(Continued)

(56) References Cited

U.S. PATENT DOCUMENTS 2,888,193 A * 5/1959 Greenwald ............. F25B 1/053
415/199.1
3,220,350 A * 11/1965 White ................. F04D 13/0613
417/357
(Continued)

FOREIGN PATENT DOCUMENTS

JP   S55-69793 A    5/1980
JP   S5569793   *  5/1980 ............. F04D 29/10
(Continued)

OTHER PUBLICATIONS

JPS5569793 translation (Year: 2023).*
International Search Report issued for International Application No. PCT/JP2021/007961, dated May 11, 2021 in 4 pages.

*Primary Examiner* — Charles G Freay
*Assistant Examiner* — David N Brandt
(74) *Attorney, Agent, or Firm* — Knobbe Martens Olson & Bear LLP

(57) ABSTRACT

To provide a simple blower which can suppress the infiltration of a target gas into a shaft hole and having a small size and cost reduction, a blower comprising a first casing (11) formed with a gas passage (11c) for introducing a high temperature gas and a shaft hole (11e) for communicating therewith, a rotating shaft (14) inserted to be freely rotatable within the shaft hole (11e), an impeller (13) housed within the first casing (11) which integrally rotates with the rotating shaft (14), a motor (15) for driving the rotating shaft (14) from the rear end side, a second casing (12) having an interior space (21) which communicates with the shaft hole (11e) and supporting the rotating shaft (14) via bearing (Continued)

(22A, 22B), and a purge gas introduction means (16) which introduces to the interior space (21), a purge gas having a higher pressure than a pressure of the shaft hole (11e), wherein the inflow of an exhaust gas into the shaft hole (11e) from the gas passage (11c) side of the first casing (11) is suppressed by introducing the purge gas into the interior space (21).

15 Claims, 8 Drawing Sheets

(51) Int. Cl.

| | | |
|---|---|---|
| *F04D 25/06* | (2006.01) | |
| *F04D 29/053* | (2006.01) | |
| *F04D 29/056* | (2006.01) | |
| *F04D 29/10* | (2006.01) | |
| *F04D 29/28* | (2006.01) | |
| *F04D 29/58* | (2006.01) | |
| *H01M 8/04089* | (2016.01) | |
| *H01M 8/04223* | (2016.01) | |

(52) U.S. Cl.
CPC ......... *F04D 29/104* (2013.01); *F04D 29/281* (2013.01); *F04D 29/5853* (2013.01); *H01M 8/04097* (2013.01); *H01M 8/04231* (2013.01); *F04D 17/10* (2013.01); *F04D 25/0606* (2013.01); *F04D 29/284* (2013.01); *F05D 2210/12* (2013.01); *F05D 2240/61* (2013.01); *Y02E 60/50* (2013.01)

(58) Field of Classification Search
CPC .. F04D 29/104; F04D 29/281; F04D 29/5853; F04D 17/10; F04D 25/0606; F04D 29/284; H01M 8/04089; F05D 2210/12; F05D 2240/61
See application file for complete search history.

(56) References Cited

U.S. PATENT DOCUMENTS

| | | | |
|---|---|---|---|
| 4,764,086 A | | 8/1988 | Jesinger |
| 5,549,449 A | * | 8/1996 | McInerney ........... F01D 25/243 |
| | | | 384/473 |
| 2021/0364001 A1 | * | 11/2021 | Zhao ................... F04D 29/5806 |

FOREIGN PATENT DOCUMENTS

| | | |
|---|---|---|
| JP | S62-159795 A | 7/1987 |
| JP | H01-249991 A | 10/1989 |
| JP | H07-29582 A | 1/1995 |
| JP | H7-145819 A | 6/1995 |
| JP | 2001-173591 A | 6/2001 |
| JP | 2007-32670 A | 2/2007 |
| JP | 2012-107609 A | 6/2012 |
| WO | 2004/070209 A1 | 8/2004 |

* cited by examiner

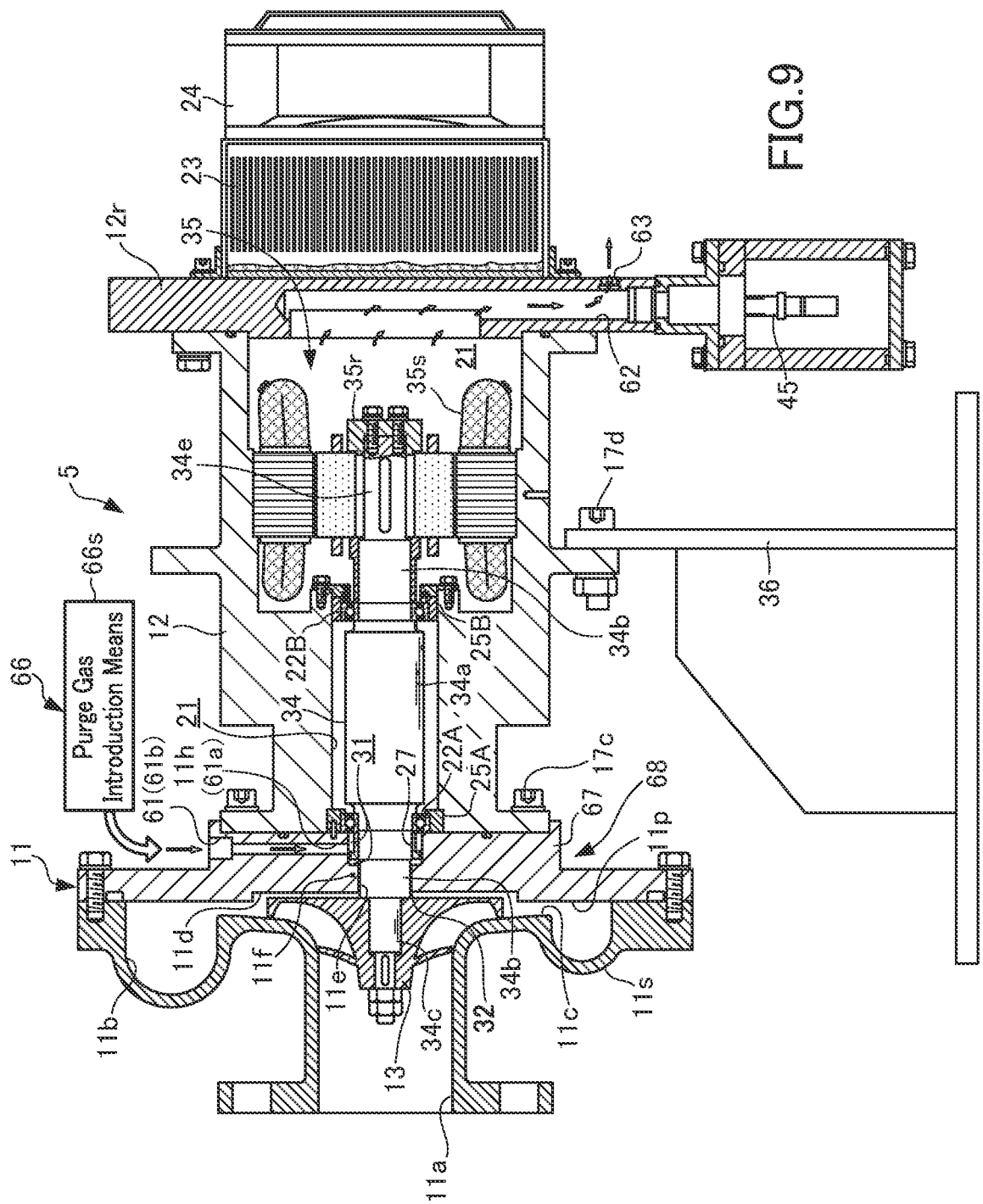

BLOWER

CROSS-REFERENCE TO RELATED APPLICATIONS

This application is the U.S. National Phase under 35. U.S.C. § 371 of International Application PCT/JP2021/007961, filed Mar. 2, 2021, which claims priority to Japanese Patent Application No. 2020-035041, filed Mar. 2, 2020. The disclosures of the above-described applications are hereby incorporated by reference in their entirety.

TECHNICAL FIELD

The present invention relates to a blower, specifically, relates to a blower suitable for boosting and blowing a gas to be blown from a fuel cell, an electrolytic cell and the like.

BACKGROUND ART

Blowers which can suck and boost a gas to be blown, and which can ensure the uniformity of temperature within various furnaces such as a heat treatment furnace and a firing furnace and the improvement of heating efficiency are conventionally known.

Further, in fuel cells which have become widely used as power generation systems in recent years, for example, a Solid Oxide Fuel Cell, when a humidified high temperature exhaust gas (hereinafter, referred to as the anode-off gas) which is discharged from a fuel electrode is recirculated to a fuel cell, there is the advantageous point that unreacted residual fuel in the exhaust gas can be reused, a reaction product water free of impurities can be used in so-called steam reformation, and the power generation efficiency can be increased, thus, a so-called recirculation blower which is a blower that boosts and blows an anode-off gas to the fuel cell so that it may be recirculated has been used.

Furthermore, a water electrolysis apparatus having a high electrolytic efficiency for hydrogen production which uses the reverse reaction of a solid oxide fuel cell, for example, a Solid Oxide Electrolysis Cell has been developed in recent years, but even with this kind of apparatus, the hydrogen is produced by high-temperature steam electrolysis, thus, a blower is used in order to compress and recirculate the production gas to the fuel electrode to prevent oxidative deterioration of the fuel electrode.

In this kind of blower, a shaft seal structure has been devised so that the gas to be blown is not permitted to leak to the outside from a shaft hole part through which a rotating shaft of an impeller passes.

For example, the blower described in PTL 1 comprises a heat resistant impeller cantilevered by a rotating shaft, a bearing which supports the rotating shaft of the impeller to be freely rotatable with respect to a casing, a heat insulating layer disposed between the impeller and the bearing, and a cooling part disposed between the heat insulating layer and the bearing, and by this blower having a first coupling of a pair of magnetic couplings disposed on a rear end part opposite to the impeller of the rotating shaft and a nonmagnetic partition wall disposed between the first coupling and a second coupling of the magnetic joint mounted on a front-end part of the motor shaft for driving, a space surrounding the rotating shaft of the impeller is hermetically sealed off from the outside with the nonmagnetic partition wall and a casing.

Further, PTL 2 describes a blower (compressor) which sucks and compresses a process gas from an intake port by the rotation of a rotating body, and uses a dry gas seal in a shaft seal of a rotating shaft of the rotating body while supplying a part of the process gas to the dry gas seal, and flares the gas discharged from narrow gaps between a rotating ring and stationary rings to the atmospheric air side.

CITATION LIST

Patent Literature

PTL 1 WO 2004/070209
PTL 2 JP-A 2012-107609

SUMMARY OF INVENTION

Technical Problem

The conventional blower as described in the aforementioned PTL 1 has the advantageous point that a completely gas-tight state can be established in which a space surrounding the rotating shaft of the impeller is hermetically sealed off from the outside by a nonmagnetic partition wall and a casing.

However, there is concern that, depending on the operational state of the blower, a humidified anode-off gas may not be able to infiltrate into the shaft hole or reduce bearing performance.

On the one hand, the blower described in PTL 2 has the problem that separates from the dry gas seal which uses the process gas, flare processing, etc., of a discharge seal gas containing a seal element which uses an inert gas (nitrogen gas) and a process gas component is necessary to produce a seal which prevents leakage of the process gas to the outside, thus, the configuration is complicated and it is difficult to reduce the cost.

The object of the present invention is to provide a blower which can reliably prevent a target gas from infiltrating into the shaft hole with a simple configuration in order to solve the unsolved problems as described above.

Solution to Problem (1) In order to obtain the aforementioned object, the blower described in the present invention is provided with a first casing formed by a gas passage for introducing a target gas and a shaft hole in communication with the gas passage, a rotating shaft inserted to be freely rotatable in the shaft hole of the first casing, an impeller housed within the first casing at a front-end side of the rotating shaft and which can rotate integrally with the rotating shaft, a motor which drives the rotating shaft from a rear end side, a second casing having an interior space in communication with the shaft hole and supporting the rotating shaft via a bearing, and a purge gas introduction means which introduces a purge gas having a higher pressure than that in the shaft hole of the first casing into the interior space of the second casing, wherein an inflow of the target gas from a gas passage side of the first casing into the shaft hole is suppressed by introducing the purge gas into the interior space of the second casing.

With this configuration, the blower of the present invention introduces the purge gas having a higher pressure than that in the shaft hole in communication with the gas passage of the first casing to the interior space of the second casing supporting the rotating shaft via the bearing to be freely rotatable. Therefore, the purge gas in the interior space side of the second casing suppresses the high temperature gas introduced into the gas passage of the first casing from infiltrating into the shaft hole on a back side of the impeller. Note that, the purge gas pressure may be approximately constant or variable.

(2) A preferred embodiment of the present invention may be configured such that when the purge gas introduction means introduces the purge gas into the interior space of the second casing, the purge gas is filled on a shaft hole side from at least the bearing in the interior space while the pressure of the purge gas is maintained at a higher pressure than that within the shaft hole.

In this way, when the purge gas is introduced into the interior space of the second casing, the pressure of the purge gas is maintained at a higher pressure than in the shaft hole, thus, the exhaust gas on the gas passage side of the first casing is more effectively suppressed from flowing into the shaft hole. Further, even when the bearing is cooled to the dew point or less, the dry purge gas suppresses condensation in the vicinity of the bearings, and the elution, etc., of the grease for bearing lubrication is effectively suppressed. Note that, the purge gas introduction means should always be operated.

(3) A preferred embodiment of the present invention may be configured such that the high temperature gas is discharged from a fuel electrode side of a fuel cell, and the purge gas comprises at least a fuel component of the fuel cell, wherein when the purge gas is introduced into the interior space of the second casing, the purge gas flows to the gas passage side of the first casing through an annular clearance in the periphery of the rotating shaft in the shaft hole.

In this case, the exhaust gas (anode-off gas) of the fuel cell is recirculated to the supply path side of the fuel gas together with the $H_2O$ produced by power generation, but the dry purge gas comprising the fuel component can flow from the interior space of the second casing to the shaft hole of the first casing, and can flow to the gas passage side of the first casing. Therefore, the humidified exhaust gas from the fuel electrode side is effectively suppressed from entering into the interior space of the second casing, and the exhaust gas to be recirculated is not contaminated by the purge gas.

(4) A preferred embodiment of the present invention may be configured such that the first casing is provided with a heat insulating part which is a substantially plate-like body positioned on the back side of the impeller and penetrated by the rotating shaft, and a part of a purge gas passage which introduces the purge gas within the interior space to the shaft hole side is open in a vicinity of the rear end of the shaft hole on a bearing side of the heat insulating part.

In this case, the part of the purge gas passage in the vicinity of the rear end of the shaft hole is open in the vicinity of the rear end of the shaft hole of the rotating shaft, thus, the dry purge gas is properly supplied in the vicinity of the rear end of the shaft hole, and the humidified exhaust gas is more effectively suppressed from entering the interior space of the second casing through the shaft hole.

(5) A preferred embodiment of the present invention in which the heat insulating part may have an airtight wall surface having a lower thermal conductivity than the second casing in at least a vicinity of the shaft hole, and the airtight wall surface may have a high temperature side surface portion facing a back surface of the impeller spaced at a predetermined clearance, a cylindrical wall surface portion which forms the shaft hole, and a low temperature side surface portioned in a vicinity of the part of the purge gas passage.

In this way, the airtight wall surface of the heat insulating part, the impeller and the rotating shaft form the gas passage extending to the back side of the impeller from the shaft hole by the airtight wall surface. Therefore, the dry gas seal function of the shaft hole can be sufficiently ensured, and the heat transfer to the bearing can be more effectively suppressed.

(6) A preferred embodiment of the present invention may be configured such that a plurality of members comprising at least the heat insulating part, the rotating shaft and the bearing define an annular gas storage chamber which opens a part of the purge gas passage on a rear end side of the shaft hole, and a clearance passage having a smaller clearance dimension than the annular gas storage chamber is formed between the cylindrical wall surface portion of the airtight wall surface of the heat insulating part and the rotating shaft.

With this configuration, the air within the gas storage chamber to which the bearing is exposed at the rear end side of the shaft hole can be rapidly replaced with the purge gas in the initial operation and the like, the purge gas can be stably supplied within the annular gas storage chamber of the rear end side of the shaft hole, and regardless of pressure fluctuations on the impeller side due to load fluctuations, the purge gas can stably ensure the dry gas sealing performance.

(7) A preferred embodiment of the present invention may be configured such that a part of the purge gas passage which is on the rear end side of the shaft hole and which is on a shaft hole side of the bearing opens on an outer peripheral surface of the front-end side of the rotating shaft and extends to radial and axial rearward sides of the rotating shaft.

In this case, the part of the purge gas passage through which the rotating shaft passes makes it possible for the purge gas to rapidly and reliably flow to the shaft hole side due to the bearing within the interior space of the second casing, and it is possible to more effectively suppress the humidified exhaust gas within the first casing from infiltrating and condensing within the shaft hole and the bearing.

(8) A preferred embodiment of the present invention may be configured such that a part of the purge gas passage is on the rear end side of the rotating shaft and opens on an end surface of the rotation shaft extending in a radial direction of the rotating shaft on a radially inward side from the outer peripheral surface of the front-end side of the rotating shaft.

In this case, the purge gas is urged radially outward due to the centrifugal force accompanying the rotation of the purge gas passage extending radially on the front-end side of the bearing during the rotation of the rotating shaft, and the sucking of the purge gas from the rear end part side of the purge gas passage is facilitated.

(9) A preferred embodiment of the present invention may be configured such that the first casing is provided with a heat insulating part which is a substantially plate-like body positioned on the back side of the impeller and penetrated by the rotating shaft, and a part of the purge gas passage which introduces the purge gas into the shaft hole side of the bearing within the interior space opens radially outward toward an inner peripheral surface of the bearing.

In this case, a part of the purge gas passage opens toward the inner peripheral surface of the bearing, thus, it is possible to effectively cool the inner peripheral surface side of the bearing, which is difficult to cool from the casing side.

(10) A preferred embodiment of the present invention may be configured such that a part of the purge gas passage comprises a first groove part that opens radially outward toward an inner ring of the bearing and a plurality of second groove parts that extend from the first groove part toward the shaft hole side and open on an outer peripheral surface of the rotating shaft between the heat insulating part and the bearing.

With this configuration, the inner ring of the bearing can be effectively cooled by the purge gas flowing through the first groove part and the plurality of second groove parts of the purge gas passage, and it is possible to flow out the purge gas substantially evenly in the periphery of the rotating shaft between the beat insulating part and the bearing from the plurality of the second groove parts, thus, the inner ring side of the bearing can be cooled more effectively.

Advantageous Effects of Invention

The present invention can provide a blower which can reliably prevent a target gas from infiltrating into a shaft hole with a simple configuration.

BRIEF DESCRIPTION OF DRAWINGS

FIG. 9 is a side sectional view of the schematic configuration of a blower according to a fifth embodiment of the present invention.

DESCRIPTION OF EMBODIMENTS

Preferred embodiments of the present invention will be described below with reference to the drawings.

First Embodiment

The blower according to the first embodiment of the present invention is provided as a so-called recirculation blower in a power generation system comprising a fuel cell, for example, a combined power generation system (for example, refer to JP-A 2019-145394, JP-A 2014-107071, etc.) in which a solid oxide fuel cell (hereinafter, referred to as SOFC) is combined with a micro gas turbine (hereinafter, referred to as MGT).

First, a summary of the power generation system will be described.

Figure 1:
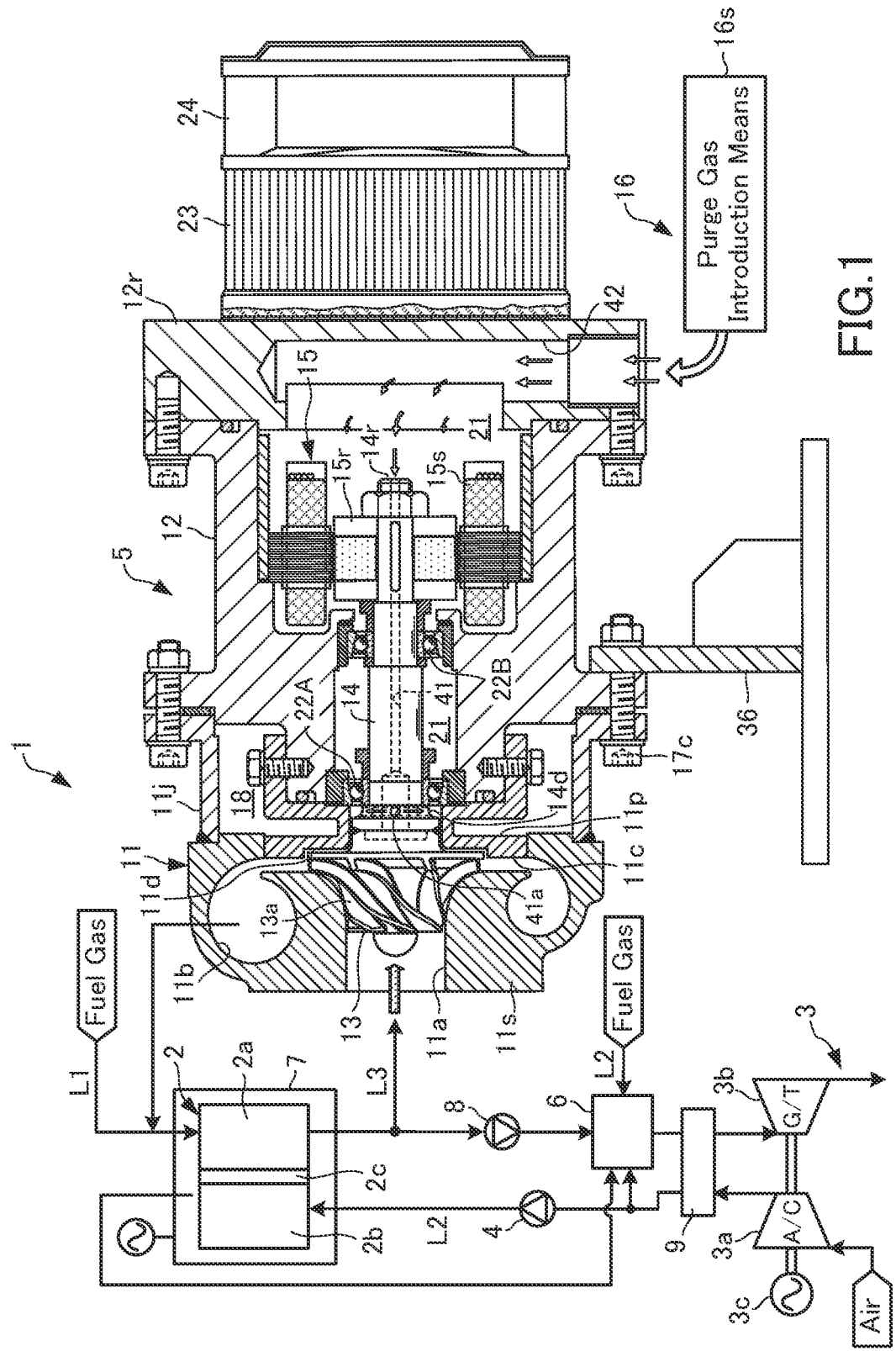
FIG. 1 is a side sectional view illustrating a schematic configuration of a blower according to a first embodiment of the present invention.

As illustrated in the schematic configuration of FIG. 1, a power generation system 1 of the present embodiment is provide with a fuel system, an air system and an exhaust gas system, wherein a fuel gas is input to a fuel electrode (anode) side of an SOFC 2 which is a fuel cell via a fuel supply line L1, and air boosted by a compressor 3a of an MGT 3 is input to an air electrode (cathode) side of the SOFC 2 by an air supply line L2 and an air blower 4.

Further, a part of the anode-off gas from a fuel electrode 2a of the SOFC 2 is boosted by a recirculation blower 5 (blower) on a recirculation line L3 to be returned to the fuel supply line L1 and recirculated to the SOFC 2. The remaining part of the anode-off gas and the exhaust gas (hereinafter, referred to as the cathode-off gas) from an air electrode 2b of the SOFC 2 are supplied to a combustor 6, and the combustion gas from the combustor 6 is sent to a gas turbine 3b of the MGT 3 so as to drive the compressor 3a and a generator 3c of the MGT 3.

A gas blower 8 for sending the remaining part of the anode-off gas to the combustor 6 is provided the upstream side of the combustor 6, and a heat exchanger 9 for exchanging heat between the combustion gas discharged from the combustor 6 and the air sent from the MGT 3 compressor 3a to the air supply line L2 is provided the downstream side of the combustor 6. Furthermore, a gas flow rate control valve or the like (not shown) is provided on the upstream side of each of the air blower 4, the gas blower 8 and the recirculation blower 5.

The fuel gas supplied to the SOFC 2 and the fuel gas supplied to the combustor 6 are respectively manufactured from, for example, natural gas, municipal gas, or, hydrogen, carbon monoxide, methane or other hydrocarbon gases, or, carbonaceous material (oil, coal, and the like) by gasification equipment, and are prepared so that the calorific value is substantially constant. Further, fuel gas heated to a high temperature is supplied to the fuel electrode 2a of the SOFC 2 in accordance with the SOFC 2 operating temperature (for example, in the range of 700° C. to 1000° C.).

Further, by merging with an anode-off gas boosted by the recirculation blower 5, the fuel gas supplied to the fuel electrode 2a of the SOFC 2 becomes, for example, a high temperature hydrogen rich gas obtained by reforming and reacting water vapor having a volume ratio in the range of 30% to 50% with a hydrocarbon gas of the fuel, and thus, contained hydrogen ($H_2$), carbon monoxide (CO), and lower hydrocarbons (for example, methane ($CH_4$)). The oxidizing gas supplied to the SOFC 2 is a gas containing approximately 15% to 30% oxygen, for example, air, but other than air, a mixed gas of combustion exhaust gas and air, a mixed gas of oxygen and air and the like may be used (hereinafter, the oxidizing gas supplied to the SOFC 2 is simply referred to as air).

Specifically, a predetermined oxidation reaction ($2H_2 + 2O^{2-} \rightarrow 2H_2O + 4e^-$ ... (1)) between steam reformed high temperature hydrogen rich gas and oxide ions ($O^{2-}$) in the electrolyte 2c of the SOFC 2 occurs on the side of fuel electrode 2a of the SOFC 2. On the one hand, a predetermined reduction reaction ($O_2 + 4e^- \rightarrow 2O^{2-}$ ... (2)) occurs between the oxygen ($O_2$) in the air boosted and supplied and the electrons supplied from the fuel electrode 2a via an external circuit on the side of air electrode 2b of the SOFC 2. As a result, in the SOFC 2, a fuel ($H_2$) can be chemically reacted with oxygen ($O_2$) to generate electricity, and water ($H_2O$) can be produced.

Note that, steam reformation of the fuel gas is an endothermic reaction which reacts, for example, methane ($CH_4$) which is a main component of the fuel gas with water vapor ($H_2O$) to reformulate hydrogen ($H_2$) with carbon monoxide (CO), the CO contained in the reformulated fuel gas can be reacted with the oxide ion ($O^{2-}$) in the electrolyte to produce electrons ($CO+O^{2-} \rightarrow CO_2+2e^-$ ... (3)), and thus, can be a fuel.

The DC power output at the SOFC 2 is converted to three-phase AC power, for example, an inverter 7, and boosted by a transformer together with the three-phase AC power from the generator 3c of the MGT 3. Moreover, part of the three-phase AC power from the SOFC 2 and the MGT 3 is supplied to SOFC 2 and accessories of the MGT 3. Certainly, the DC power output at the SOFC 2 can be used as DC.

Figure 2:
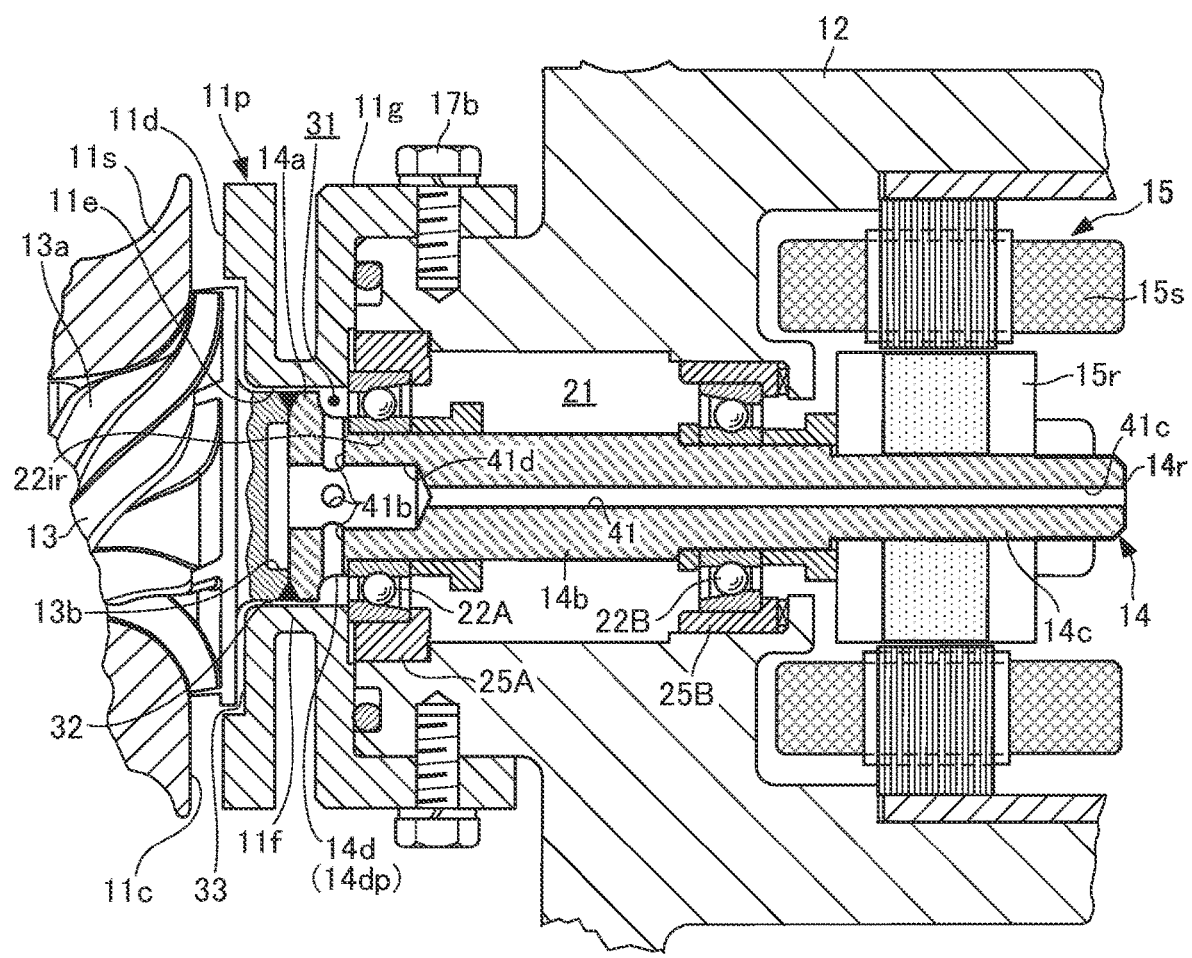
FIG. 2 is a side sectional view of main portions of the blower according to the first embodiment of the present invention.

The recirculation blower 5 illustrated in FIGS. 1 and 2 blows air at an amount and static pressure within predetermined ranges so that the anode-off gas at a high temperature, for example, in the range of 750° C., humidified by the water ($H_2O$) produced by the SOFC 2 power generation may be recirculated to the SOFC 2.

As illustrated in FIG. 1, the recirculation blower 5 is a centrifugal-compression type air blower which boosts and blows the high temperature anode-off gas discharged from the SOFC 2 (fuel cell) fuel electrode 2a, and is provided with a first casing 11, a second casing 12, an impeller 13, a rotating shaft 14, a motor 15, and, a purge gas introduction means 16.

The first casing 11 is configured to include a scroll casing part 11s for introducing the anode-off gas into the gas passage 11c extending from a suction port 11a on the center side to a scroll passage 11b around the first casing 11, and a back-plate collar member 11p which is fitted and integrally fixed to the rear side of the scroll casing part 11s, and defines a storage space of the impeller 13 in the gas passage 11c.

As illustrated in FIG. 2, the back-plate collar member 11p includes a back-plate part 11d facing the back surface of the impeller 13, a cylindrical part 11f forming a shaft hole 11e which opens in the center of the back-plate part 11d, and a support 11g which is fixed with a plurality of bolts 17b to a front-end portion on the inner peripheral side of a second casing 12, and a rotating shaft 14 penetrates into the shaft hole 11e.

The back-plate collar member 11p is a member having a smaller thermal conductivity than the second casing 12, at least the back-plate part 11d constitutes a substantially plate-shaped heat insulating part positioned on a back side of the impeller 13, specifically, a substantially annular plate-shaped heat insulating part having an annular stepped surface facing both the outer peripheral surface of the back surface side and the back surface of the impeller 13.

The back-plate part 11d and the cylindrical part 11f of the back-plate collar member 11p are airtight members respectively positioned in a vicinity of the shaft hole 11e, and the back-plate part 11d of the back-plate collar member 11p is a high temperature side wall surface portion facing the back surface of the impeller 13 spaced at a predetermined clearance, thus, the cylindrical part 11f is the airtight cylindrical wall surface portion which forms the shaft hole 11e.

The scroll casing part his is fastened to the second casing 12 by a plurality of bolts 17c via a fastening flange 11j welded so as to project the back side of the outer peripheral portion of the scroll casing part his. Note that, it is considered that the heat insulating layer is provided in an annular space 18 formed between the back-plate collar member 11p and the fastening flange 11j.

The second casing 12 has an interior space 21 in communication with the shaft hole 11e of the first casing 11 and is a bottomed tubular body which supports the rotating shaft 14 via a pair of bearings 22A,22B, and has a rear end side (motor case portion) which stores a stator 15s of the motor 15 having a relatively large diameter relative to the front-end side (bearing box portion) which stores the bearings 22A, 22B. On the one hand, the rotating shaft 14 has a gradually reduced diameter from the side of the impeller 13 to the side of the motor 15, and the impeller 13 and the rotating shaft 14 can be detached from the front side with respect to the second casing 12.

Figure 3:
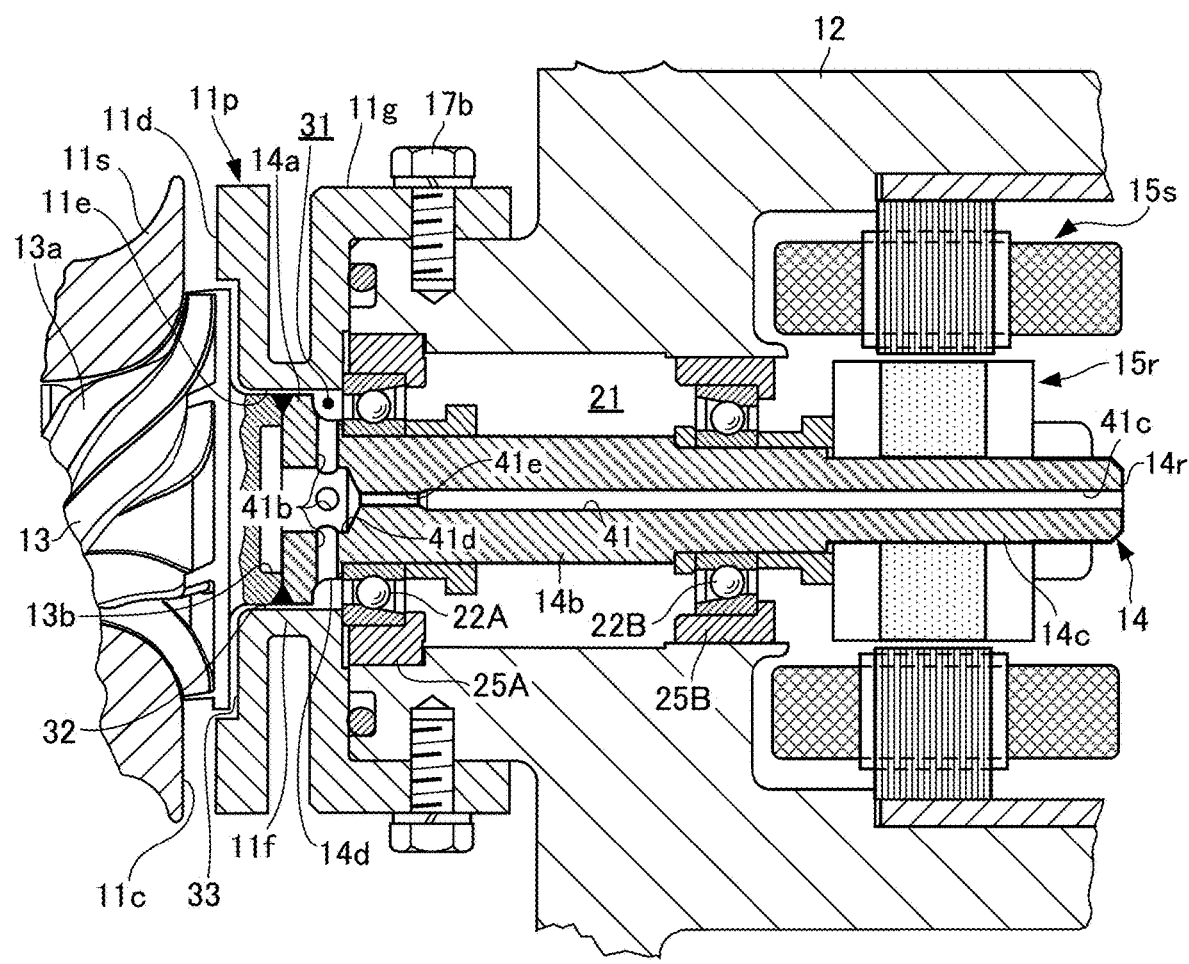
FIG. 3 is a side sectional view of main portions of a separate embodiment for increasing the cooling effect of an impeller rotating shaft and a bearing purge gas in the blower according to the first embodiment of the present invention.

As illustrated in FIG. 3, by the outer diameter of a rotor 15r of the motor 15 being smaller than the inner diameter of the front-end side of the second casing 12, an integral rotating element whose rotation balance has been adjusted from the impeller 13 to the rotor 15r may be detached from the front side (left side in the drawing) with respect to the second casing 12 together with the back-plate collar member 11p.

The second casing 12 is made of, for example, copper, a heatsink 23 having a large cooling area integrally joined to a copper rear end cover part 12r is fastened to the rear end of the second casing 12, and a cooling fan 24 is mounted on the heatsink 23.

The impeller 13 is integrally supported on the front-end side of the rotating shaft 14 while being stored to be freely rotatable in the first casing 11, and has a wing shape which can boost the pressure in order to suck and recirculate an anode-off gas by integrally rotating with the rotating shaft 14.

In the drawings, the impeller 13 has a plurality of blades 13a having a 3-dimensional twisted shape, but it is not limited to a specific shape, and may be any of the well-known centrifugal-compression types. However, a hub back surface part 13b of the impeller 13 should be hollow in order to reduce the cross-sectional area that contributes to heat transfer.

The rotating shaft 14 is inserted to be freely rotatable in the shaft hole 11e of the first casing 11, and has a large diameter part 14a welded to a hub back surface part 13b of the impeller 13, an intermediate diameter part 14b fitted to and supported on an inner ring of the pair of bearings 22A,22B, and a small diameter part 14c which penetrates a rotation center part of the motor 15 and is integrally joined to the rotor 15r.

Further, the purge gas passage 41 (part of the purge gas passage) which opens on a side of the bearings 22A,22B relative to the back-plate part 11d (heat insulating part) of the back-plate collar member 11p, and, on an outer peripheral surface in a vicinity of a rear end of the shaft hole 11e is formed in the rotating shaft 14. The purge gas passage 41 forms a passage of the purge gas (hereinafter also referred to as shaft hole route) also in the rotating shaft 14, apart from a passage of the purge gas (annular clearance, hereinafter also referred to as bearing route) that passes through a clearance between the rotor 15r and the stator 15s around the rotating shaft 14 and passes through the inside of the bearings 22A,22B to the gas storage chamber 31 when the purge gas from the purge gas introduction means 16 is supplied from the rearward side of the motor 15 into the interior space 21 of the second casing 12, so that the supply pressure of the purge gas can be introduced to the shaft hole 11e on the forward side from the bearings 22A,22B.

The support 11g of the back-plate collar member 11p fastened to the second casing 12 is the airtight low temperature side surface portion positioned in the vicinity of a front-end side of the purge gas passage 41.

The back-plate collar member 11p and the impeller 13 are both made of materials having a high temperature strength and which can suppress deterioration of the material strength due to high temperature steam oxidation in order to be in contact with a humidified high temperature (for example, in the range of 750° C.) anode gas. The rotating shaft 14 may be formed from the same material. Examples of the material include Fe—Ni—Cr based alloy and Ni—Cr—Co based alloy, or, ceramics such as dense silicon carbide (SiC), silicon nitride (Si3N4) and sialon (SiAlON) having a porosity of 10% or less can be used.

The motor 15 is an electric rotational drive means which drives the rotating shaft 14 from the rear end side, for example, a 3-phase motor, and may have the well-known stator 15s and rotor 15r. The arrangement of the windings, yoke, magnets, and the like in the motor 15 is not limited to a specific state.

The purge gas introduction means 16 introduces a gas having a higher pressure than that inside of the shaft hole 11e of the first casing 11 into the interior space 21 of the second casing 12 as a purge gas for removing the anode-off gas from the interior space 21, and the purge gas can be introduced into the interior space 21 of the second casing 12 in order to suppress an inflow of the anode-off gas from the gas passage 11c of the first casing 11 into the shaft hole 11e.

Since the anode-off gas of the SOFC 2 contains carbon monoxide and moisture, the purge gas introduction means 16 is configured so as to continuously introduce the purge gas into the interior space 21 of the second casing 12 and continuously introduce the purge gas also into the forward side of the bearings 22A, 22B through an axial passage 41c described later in the rotating shaft 14 so that the shaft hole 11e of the first casing 11 is constantly in a gas-tight seal state. The purge gas introduction means 16 may change the amount of purge gas introduced per unit time, for example, in accordance with the rotational speed [rpm] of the impeller 13 which corresponds to the driving load of the SOFC 2.

Specifically, the purge gas introduction means 16 can fill a purge gas having a predetermined pressure capable of removing a residual gas (at the time of the initial operation, air) on a shaft hole side of at least one bearing 22A in the interior space 21 of the second casing 12, for example, a fuel gas within the internal space 21 on the shaft hole side of at least one of the bearings 22A, in this case, the entirety of the interior space 21, and can maintain the purge gas pressure within the interior space 21 at a higher pressure than the pressure of the back side of the impeller 13 within the shaft hole 11e and within the gas passage 11c. Note that, the purge gas introduction means 16 may supply the purge gas at a substantially constant pressure, or the purge gas may be supplied at a pressure that is variably set in a stepwise manner or a pressure that is continuously and variably controlled.

The purge gas introduction means 16 will not be described in detail, but contains a fuel supply source which extracts a part of the fuel gas from the supply path, an introduction control valve which may adjust the purge gas pressure in accordance with the rotational speed [rpm] of the impeller 13 specifically, in accordance with the pressure within the interior space 21, a purge gas introduction passage 42 formed in the rear end cover part 12r of the second casing 12, and airtight pipes, fitting and the like which are not shown. The purge gas introduction passage 42, the above-mentioned airtight pipes and the like constitute the remainder of the purge gas passage positioned on the upstream side of the purge gas passage 41 and the like of two paths (bearing route and shaft hole route) inside and outside of the rotating shaft 14.

The purge gas pressure which opposes the pressure within the shaft hole 11e and the pressure on the back side of the impeller 13 within the gas passage 11c can be variably set by selectively controlling an introduction control valve of the purge gas introduction means 16 based on the detected results (sensor detection information which is not shown) of the operating conditions, for example, the rotational speed [rpm] of the impeller 13 and the pressure within the interior space 21, and a data map of the purge gas pressure obtained from the test results in advance within the specified range of operating conditions.

In the present embodiment, the target gas for blowing introduced into the gas passage 11c and boosted is an anode-off gas discharged from the fuel electrode 2a of the SOFC 2, and the purge gas introduced into the shaft hole side through the two paths inside and outside of the rotating shaft 14 in the interior space 21 of the second casing 12 contains the fuel components of the SOFC 2. Certainly, the purge gas which is a dry seal gas may be nitrogen gas or another dry seal gas which does not contain the fuel component of the fuel cell.

Note that, the purge gas of the present invention is not limited to a fuel gas, and may be other gases such as nitrogen gas, air and the like, the blower of the present invention is not limited to the recirculation blower 5, and may be the air blower 4 in which the target gas is air, or may be the gas blower 8 in which the target gas is the anode-off gas, and may boost and blow a gas other than the high temperature gas using the fuel cell. Further, the target gas of the present invention means a gas which is the target for blowing having an ordinary temperature, but in the present embodiment, the target gas is a gas heated to a temperature higher than room temperature, for example, is a high temperature gas heated to a temperature of several hundred degrees Celsius.

In the present embodiment, an annular gas storage chamber 31 surrounding the rotating shaft 14 on a rear end side of the shaft hole 11e is defined by a plurality of members including the back-plate collar member 11p, the rotating shaft 14, and the bearing 22A, and the purge gas passage 41 communicates with the gas storage chamber 31. Further, a thin cylindrical clearance passage 32 having a smaller radial clearance dimension than the annular gas storage chamber 31 is formed between the cylindrical part 11f which is the airtight cylindrical wall surface portion of the back-plate collar member 11p and the rotating shaft 14. Furthermore, a thin plate-shaped clearance 33 expanding in the direction substantially orthogonal to the thin cylindrical clearance passage 32 and bent in a crank shape to the radially outward side is formed between the back surface of the impeller 13 and the back-plate collar member 11p.

Moreover, when the purge gas is introduced in the interior space 21 of the second casing 12, the aforementioned purge gas pressure is set so that the purge gas flows through the clearance passage 32 around the rotating shaft 14 in the shaft hole 11e to the side of the gas passage 11c of the first casing 11 within a predetermined flow amount range.

A front-end side opening 41a of the purge gas passage 41 is on the front side of the bearing 22A and opens on the rear end side within the shaft hole 11e, for example, between the large diameter part 14a of the front-end side of the rotating shaft 14 and the intermediate diameter part 14b, and the other portions of the purge gas passage 41 continuing to the front-end side opening 41a extend along radial and axial rearward sides of the rotating shaft 14.

Specifically, one end side portion of the purge gas passage 41 penetrates in the radial direction and has a plurality of radial passages 41b which intersect each other at a predetermined angle (for example, 90°) at equal angular intervals so that the front-end side opening 41a opens in a plurality of locations on a stepped outer peripheral surface 14d between the large diameter part 14a and the intermediate diameter part 14b of the rotating shaft 14, and the other portion is a single axial passage 41c extending from the intersecting portion of the plurality of radial passages 41b to the rear side in the axial direction of the rotating shaft 14.

The plurality of radial passages 41b extend radially outward from a collection passage 41d positioned in the center of the large diameter part 14a of the rotating shaft 14, the single axial passage 41c penetrates the axial center portion of the intermediate diameter part 14b and the small diameter part 14c from the collection passage 41d and opens on a rear end surface 14r of the rotating shaft 14. In this case, as described above, by the supply pressure of the purge gas from the purge gas introduction means 16, the purge gas is supplied around the rotating shaft 14 and into the purge gas passage 41 in the rotating shaft 14 within the interior space 21 and is supplied to the annular gas storage chamber 31 on the forward side of the bearing 22A through a plurality of paths, thus, the purge gas having a predetermined pressure or higher is supplied into the shaft hole 11e in communication with the clearance 33 on the back surface side of the impeller 13. Additionally, during the rotation of the motor 15, the purge gas is urged radially outward by the centrifugal force accompanying the rotation of the plurality of radial passages 41b of the purge gas passage 41, the sucking of the purge gas into the purge gas passage 41 is facilitated, and the purge gas having a predetermined pressure or higher within the shaft hole 11e in communication with the clearance 33 on the back side of the impeller 13 is reliably supplied. Moreover, during the operation of the recirculation blower 5, regardless of the rotational speed of the rotating shaft 34 (even when rotation is stopped), the supply of the purge gas having a predetermined pressure or higher within the shaft hole 11e is maintained, and the internal gas is continuously replaced by the purge gas.

As illustrated in FIG. 3, a small diameter passage for cooling 41e having a smaller passage cross sectional area than both passages 41c,41d may be formed in the vicinity of the bearing 22A in the axial direction of the rotating shaft 14 so that the collection passage 41d may communicate with the axial passage 41c in the vicinity of the center of the rotating shaft 14. In this way, when the sucking of the purge gas into the purge gas passage 41 is facilitated during the rotation of the rotating shaft 14 in addition to the above-mentioned supply pressure of the purge gas from the purge gas supply means 16, the flow velocity within the small diameter passage for cooling 41e becomes larger than the flow velocities around the axial passage 41c and within the collection passage 41d. As a result, the heat transfer (convection) on the inner wall surface of the small diameter passage for cooling 41e is significantly increased, and thus, the bearing cooling efficiency can be increased due to the purge gas.

Further, the axial passage 41c on the other end side of the purge gas passage 41 is open on the surface extending radially of the rotating shaft 14 on the rear end side of the rotating shaft 14 from the bearing 22A, for example, on the rear end surface 14r, so as to be positioned on the radially inward side (rotation center side) from the stepped outer peripheral surface 14d on the front-end side of the rotating shaft 14. Note that, in this case, the axial passage 41c of the purge gas passage 41 is open with a small diameter at the center of the rear end surface 14r of the rotating shaft 14, but, for example, a tapered surface having a large diameter toward the rear side may be formed on the rear end inner peripheral part of the rotating shaft 14 so that the opening diameter of the other end becomes larger than the intermediate portion of the purge gas passage 41.

The bearings 22A,22B are, for example, angular ball bearing filled with an appropriate amount of grease, and are supported in the second casing 12 via support rings 25A,25B on the outer sides.

Note that, the recirculation blower 5 has been used in the power generation system 1 provided with the SOFC 2 as an air blower for blowing a high temperature gas, thus, generally, it is necessary that 1) the shaft seal for the shaft hole 11e of the rotating shaft 14 of the impeller 13 is completely airtight, 2)since the power generation system 1 may be used as a distributed power source in remote areas, only the power supplied from the system itself is used, and 3) the recirculation blower 5 is compact since it can be installed as a distributed power source in ordinary homes and small apartments.

Next, the operation will be described.

In the recirculation blower 5 of the present embodiment configured as above, the purge gas having a high pressure is introduced into the interior space 21 of the second casing 12 in particular into the forward gas storage chamber 31 through the two paths inside and outside of the rotating shaft 14 of the impeller 13 by the purge gas introduction means 16. Therefore, the anode-off gas introduced into the first casing 11 of the recirculation blower 5 can be suppressed from infiltrating within the shaft hole 11e of the back side of the impeller 13 by the high-pressure purge gas in the forward gas storage chamber 31 adjacent to the shaft hole 11e (annular clearance).

Further, in the present embodiment, when the purge gas introduction means 16 initially introduces and thereafter continuously introduces the purge gas into the interior space 21 of the second casing 12, the pressure of the purge gas can generally be maintained at a higher pressure than the pressure within the shaft hole 11e. Therefore, the anode-off gas on the side of the gas passage 11c of the first casing 11 is more effectively suppressed from flowing into the shaft hole 11e and from flowing into the interior space 21 of the second casing 12. Further, even in the case when the bearing 22A was cooled to the dew point (for example, 70° C. to 80° C.) or lower, the humidified anode-off gas does not infiltrate into the shaft hole 11e so that condensation in the vicinity of the bearing 22A is effectively suppressed, and the elution of grease is effectively suppressed.

In addition, in the present embodiment, fuel gas is used in the purge gas for sealing, thus, a dedicated sealing fluid is not necessary and there is no need for numerous pipes, valves, and the like for a reliable shaft seal, thus, the recirculation blower 5 has a simple configuration, and the conventional problems that the miniaturization and cost reduction are difficult are eliminated.

In addition, the purge gas containing a fuel component of the SOFC 2 flows at a predetermined flow amount through the clearance passage 32 in the periphery of the rotating shaft 14 within the shaft hole 11e to the gas passage side of the first casing, and merges with the anode-off gas, thus, the humidified anode-off gas within the first casing 11 is reliably suppressed from passing through the shaft hole 11e and entering into the interior space 21 of the second casing 12, and the anode-off gas recirculated to the SOFC 2 does not become contaminated by the purge gas.

Further, in the present embodiment, the thin cylindrical clearance passage 32 in the shaft hole 11e, the annular thin plate-shaped clearance 33 and the like expanding to the back side of the impeller 13 are formed on the airtight wall surface by the back-plate collar member 11p, the impeller 13 and the rotating shaft 14, thus, the dry gas seal function of the shaft hole 11e can be sufficiently ensured. Furthermore, the back-plate collar member 11p has an insulation function and the thermal conductivity area from the impeller 13 to the rotating shaft 14 is controlled to be small, thus, the thermal conductivity to the bearing 22A can be more effectively suppressed. In addition, the second casing 12 and the support rings 25A,25B are each formed of materials having a high thermal conductivity, thus, an effective heat removal from the bearings 22A,22B to the second casing 12 is possible, and a stable bearing performance can be ensured in combination with the effective suppression of the elution, etc., of grease from the bearings 22A,22B.

Further, in the present embodiment, the annular gas storage chamber 31 into which the purge gas passage 41 opens is defined on the rear end side of the shaft hole 11e, and the clearance passage 32 having a smaller radial clearance dimension than the annular gas storage chamber 31 is formed between the airtight cylindrical wall surface portion of the back-plate collar member 11p and the rotating shaft 14. Therefore, during the initial operation, etc., the air within the gas storage chamber 31 where the bearing 22A is exposed on the rear end side of the shaft hole 11e can be rapidly replaced with the purge gas, and the purge gas can be reliably filled within the gas storage chamber 31. Further, the predetermined-pressure purge gas is supplied into the gas storage chamber 31 through the two paths inside and outside of the rotating shaft 14 in the interior space 21 by the purge gas introduction means 16, and the introduction of the purge gas in the shaft hole route depending on the number of rotations of the impeller 13 is facilitated so that the internal residual gas is always replaced by the purge gas at a suitable flow amount. As a result, concerns such as the elution etc., of lubricant from the bearing 22A due to condensation of the water vapor can be eliminated, and the dry gas seal performance of the shaft hole 11e can be stably ensured due to the purge gas regardless of pressure fluctuations of the anode-off gas due to load fluctuations on the impeller 13.

Further, in the present embodiment, the purge gas passage 41 is open on the outer peripheral surface of the front-end side of the rotating shaft 14 on the rear end side of the shaft hole 11e and on the shaft hole side of the bearing 22A, whereas the rear end of the purge gas passage 41 opens in the vicinity of the center of the rear end surface 14r of the rotating shaft 14. Therefore, during the rotation of the rotating shaft 14, the purge gas is urged radially outward by the centrifugal force accompanying the rotation of the radial passage 41b of the purge gas passage 41 on the front-end side of the bearing 22A so as to be rapidly filled within the annular gas storage chamber 31, and facilitate the sucking of the purge gas to the purge gas passage 41. Further, regardless of changes in the number of rotations of the impeller 13, the purge gas pressure acting within the shaft hole 11e can be maintained at the required pressure. Furthermore, the purge gas flows toward the annular gas storage chamber 31 from the back side to the front side in one direction so that the residual gas in the interior space 21 of the second casing 12 is reliably replaced with the purge gas.

Therefore, in the recirculation blower of the present embodiment 5, regardless of the operating conditions, it is possible to reliably suppress the humidified high temperature anode-off gas from infiltrating to the shaft hole 11e, and, it is easy to reduce the size and cost.

Second Embodiment

Figure 4:
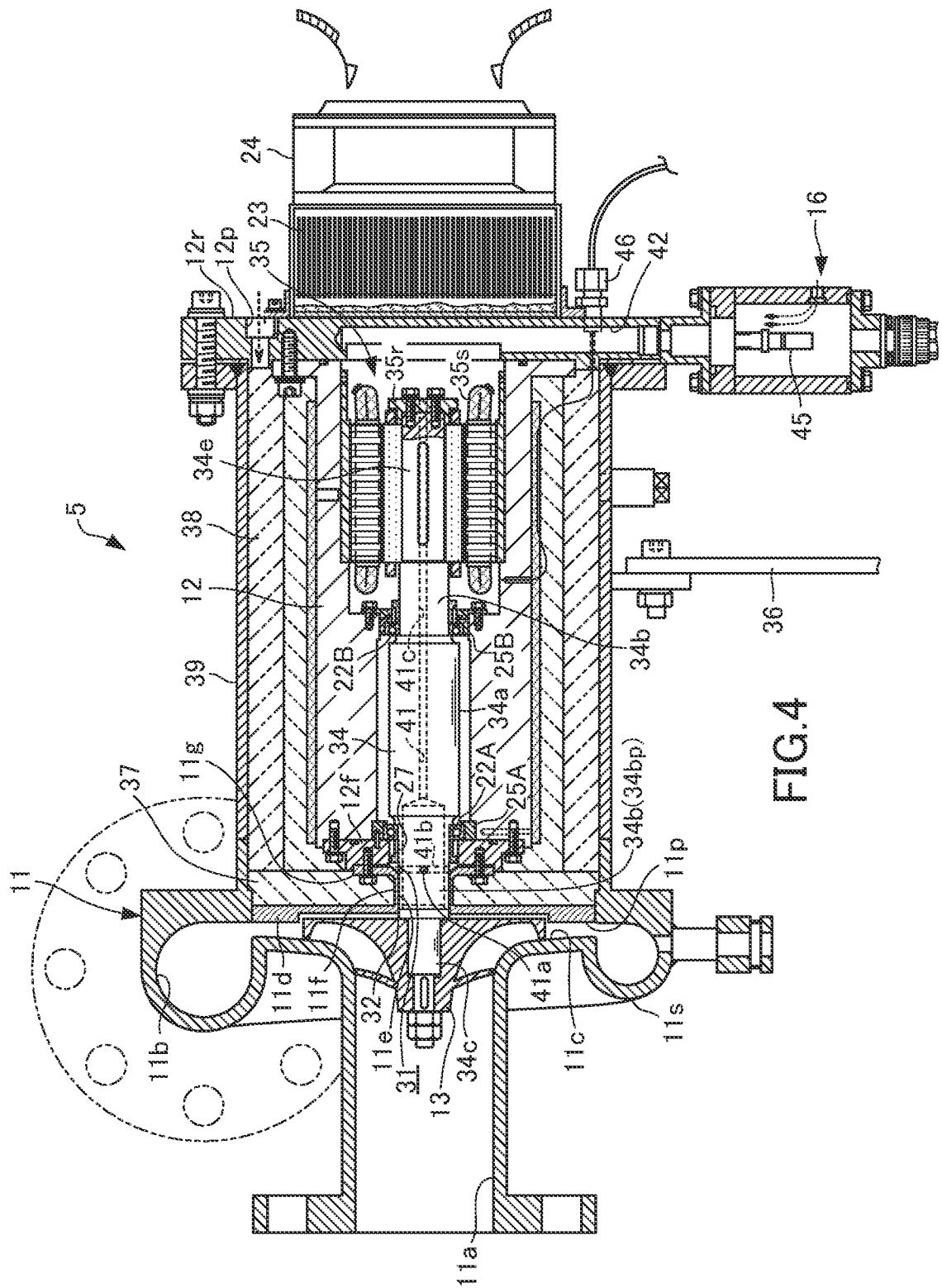
FIG. 4 is a side sectional view illustrating the schematic configuration of a blower according to a second embodiment of the present invention.

FIG. 4 illustrates a blower according to a second embodiment of the present invention.

Note that, each embodiment described below has a composition and operation similar to the aforementioned first embodiment, thus, the features which are different from the first embodiment will mainly be described, and the features similar to previous embodiments are assigned the same reference numerals as the corresponding component illustrated in FIGS. 1 and 2, and a substantially overlapping description have been omitted.

As illustrated in FIG. 4, the blower of the second embodiment is provided with an approximately disc-shaped heat-insulated wall 37 between the first casing 11 and the second casing 12 and adjacent to the back-plate collar member 11p, an approximately cylindrical heat-insulated wall 38 surrounding the second casing 12, an appropriately annular-plate mounting plate 12f intervening between the second casing 12 and the heat-insulated wall 37, and a support cylinder 39 surrounding the cylindrical heat-insulated wall 38, wherein the second casing 12 is a casing structure which is relatively vertical (long axis small diameter), and the outer peripheral surface is not exposed to the external environment. Further, the cylindrical heat-insulated wall 38 is made of, for example, ceramic fiber, and the predetermined-pressure purge gas is introduced into the cylindrical heat-insulated wall 38 from an outer purge gas passage 12p formed on the rear-end side of the cover part 12r of the second casing 12, thereby effectively preventing the situation where the anode-off gas having high temperature and humidity infiltrates into the second casing 12 from the gas passage 11c around the back-plate part 11d of the first casing 11 causing condensation.

Further, a rotating shaft 34 for supporting the impeller 13 to be freely rotatable is a large diameter part 34a having a maximum diameter at a central portion between the bearings 22A,22B without a gradual decrease in the diameter from the front-end side to the rear end side such as with the rotating shaft 14 of the first embodiment, a pair of intermediate diameter parts 34b supported by the bearings 22A,22B on both sides have substantially the same diameter, and small diameter parts 34c,34e on both sides have a smaller diameter.

An intermediate diameter part 34b on the front-end side is inserted in the shaft hole 11e, and the impeller 13 is fastened and fixed to the small diameter part 34c on the front-end side.

Moreover, a plurality of members including the back-plate collar member 11p, the rotating shaft 34 and the bearing 22A defines the annular gas storage chamber 31 surrounding the rotating shaft 34 in the vicinity of the shaft hole 11e on the rear end side of the shaft hole 11e, and a large portion of the annular gas storage chamber 31 is positioned on the outside in the radial direction relative to the thin cylindrical clearance passage 32 within the shaft hole 11e.

A motor 35 which rotatably drives the impeller 13 via the rotating shaft 34 has a rotor 35r and a stator 35s that are vertically or longitudinally long compared to the motor 15 in the first embodiment.

The arrangement of the windings, yoke, magnets, and the like in the motor 35 is not limited to a specific state in the same manner as the motor 15 in the first embodiment.

Furthermore, the rear end cover part 12r of the second casing is further provided with a hermetic connector 45 for airtightly pulling out and connecting electric wires of the motor 35 to the outside, a temperature sensor 46 for detecting the temperature of the bearings and the motor within the second casing 12 in addition to a purge gas introduction pipe, hose, or the like not shown for connecting the purge gas introduction passage 42 to an external purge gas supply source.

In the present embodiment, it is possible to obtain the operation and effect in the same manner as the first embodiment.

Third Embodiment

Figure 5:
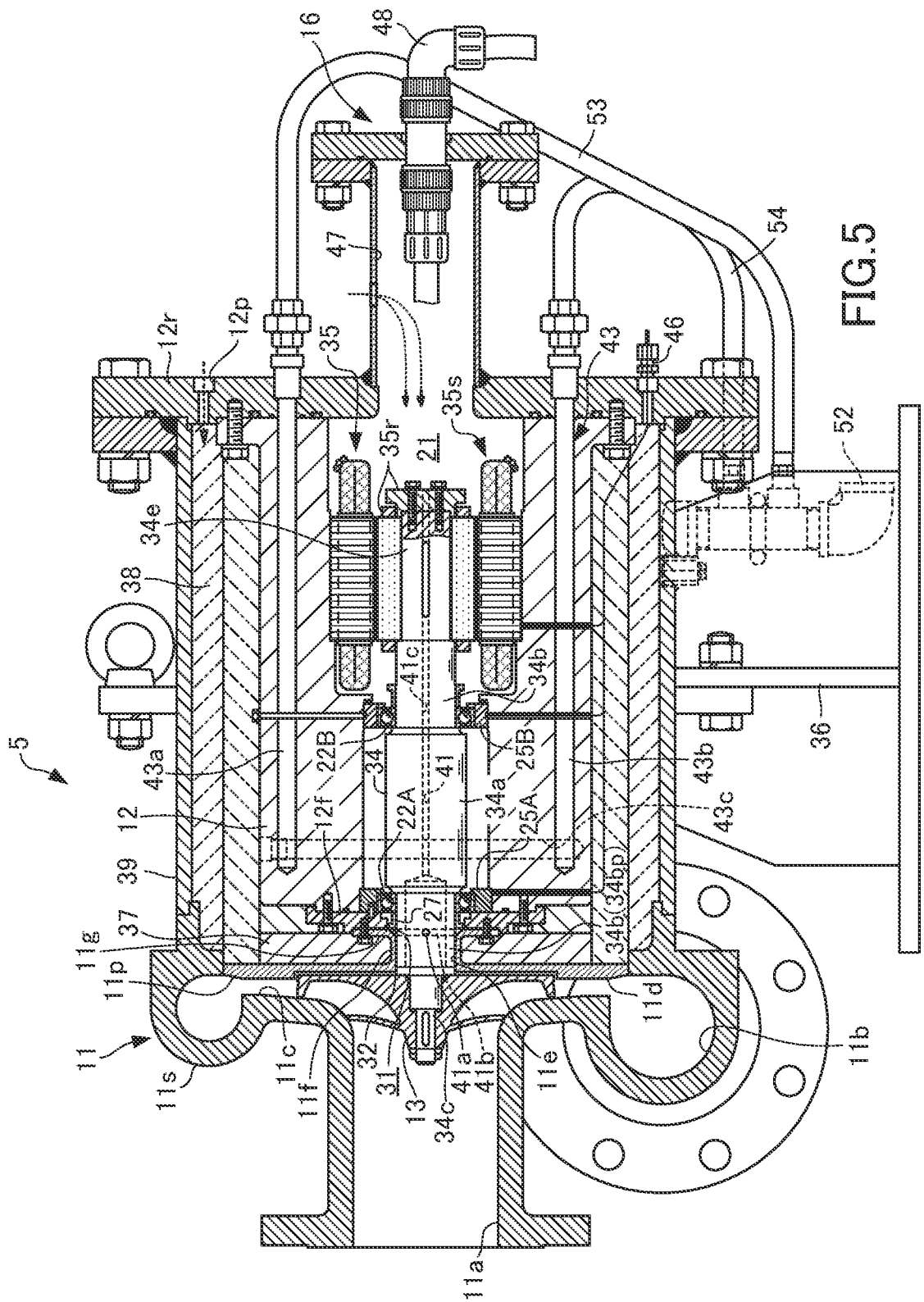
FIG. 5 is a side sectional view of the schematic configuration of a blower according to a third embodiment of the present invention.

FIG. 5 illustrates a blower according to a third embodiment of the present invention.

As illustrated in FIG. 5, while the blower of the third embodiment is provided with an approximately disc-shaped heat-insulated wall 37 adjacent to the back-plate collar member 11p, the approximately cylindrical heat-insulated wall 38 surrounding the second casing 12, and the support cylinder 39 surrounding the cylindrical heat-insulated wall 38 between the first casing 11 and the second casing 12 in the same manner as the second embodiment, the second casing 12 has a relatively short axis and large diameter. Further, the support cylinder 39 is supported on a fixed support stand 36.

Further, the rotating shaft 34 for supporting the impeller 13 to be freely rotatable has a maximum diameter at the central portion of the axis between the bearings 22A,22B in the same manner as the second embodiment, and has substantially the same diameter at the portion supported by the bearings 22A,22B.

Furthermore, although in the cases of the first and the second embodiments, the second casing 12 is not cooled by the heatsink 23 and a cooling fan 24 on the rear end side, a plurality of folded cooling passages 43 containing at least a pair of vertical passages 43a,43b and a horizontal passage 43c connected to the pair of vertical passages 43a,43b are formed in the second casing 12, and a collection pipe 52, hoses 53,54 and the like which connect these cooling passages 43 to the supply source side of an external medium for cooling are provided. Moreover, the second casing 12 can be cooled by passing a medium for cooling, for example, coolant through the folded cooling passages 43.

Further, the present embodiment is constituted so that the purge gas introduction means 16 opens in the center of the rear end cover part 12r of the second casing 12 to mount a purge gas introduction tube 47 extending in the motor rotating shaft direction, and introduces the purge gas into the interior space 21 therethrough. Moreover, a hermetic connector 48 or the like for airtightly pulling out and connecting the wiring of the motor 35 to the outside is mounted on the outer end side of the purge gas introduction tube 47.

In the present embodiment, it is possible to obtain the operation and effect in the same manner as the first embodiment.

Fourth Embodiment

Figure 6:
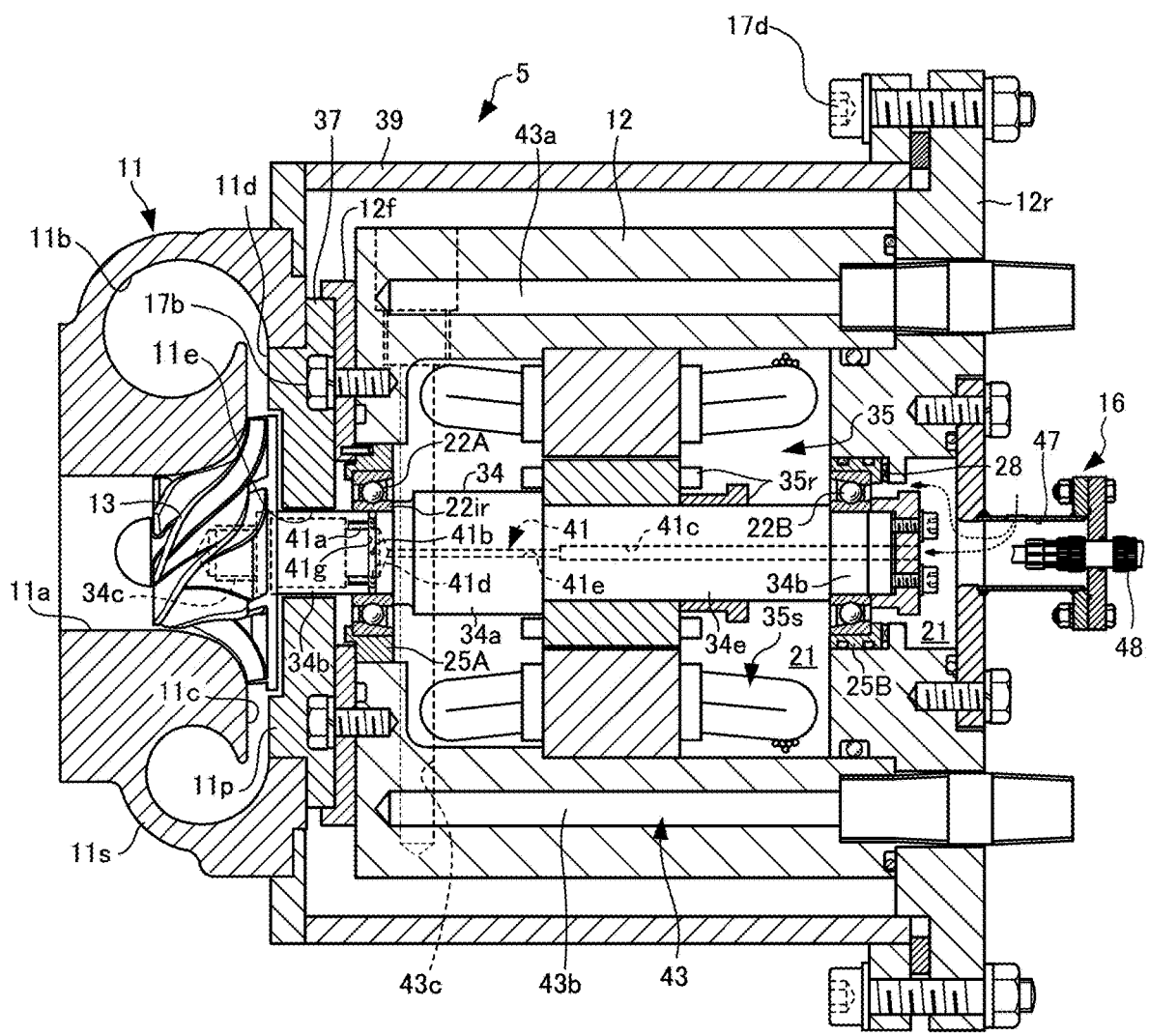
FIG. 6 is a side sectional view of the schematic configuration of a blower according to a fourth embodiment of the present invention.
Figure 7:
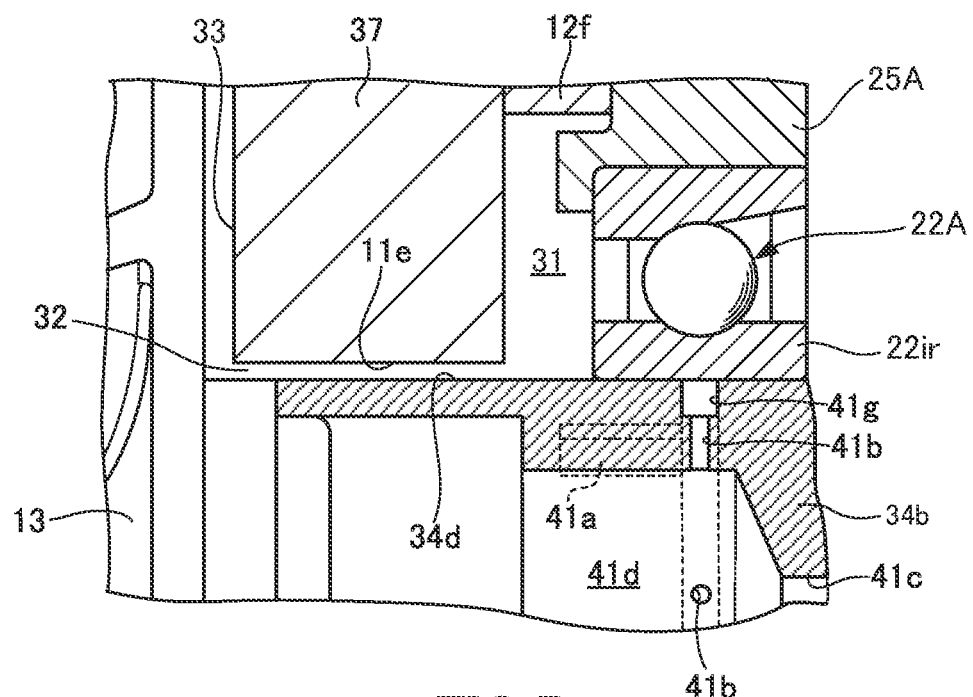
FIG. 7 is a partially enlarged schematic cross-sectional view of a shaft hole portion and a bearing portion of the blower according to the fourth embodiment of the present invention.
Figure 8:
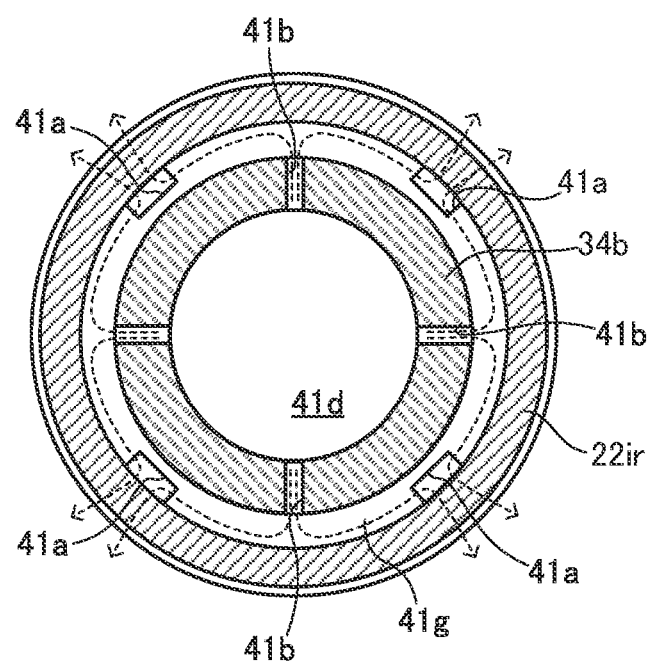
FIG. 8 is a cross-sectional view of the bearing inner ring and the rotating shaft as seen on the impeller side in the bearing portion of the blower according to the fourth embodiment of the present invention.

FIGS. 6 to 8 show a small-size and high-speed blower according to a fourth embodiment of the present invention.

The recirculation blower 5 of the present embodiment is configured so as to boost and blow an anode-off gas having a high temperature discharged from the fuel electrode 2a of the SOFC 2.

As shown in FIGS. 6 and 7, in the blower 5 of the fourth embodiment, the heat-insulated wall 37, in which the back plate collar member 11p made of ceramic fiber or the like and the mounting plate 12f are combined, is integrally connected to the second casing 12 by a plurality of bolts 17b fitted in the heat-insulated wall 37 on the back side of the first casing 11 for storing the impeller 13. The first casing 11 and the support cylinder 39 are integrally connected to the second casing 12 that stores the motor 35 via a plurality of bolts 17d fastened to the rear end cover part 12r. The heat-insulated wall 37 is a substantially plate-like body positioned on the back surface side of the impeller 13, and the rotating shaft 34 penetrates the circular central portion thereof.

Further, the rotating shaft 34 for supporting the impeller 13 to be freely rotatable is a large diameter part 34a having a maximum diameter on one side portion between the bearings 22A,22B and close to the bearing 22A, and the rotor 35r of the motor 35 is integrally mounted to the other side portion 34e. Middle diameter parts 34b on the inner and outer sides of the bearings 22A,22B have substantially the same diameter and are supported to be freely rotatable by the second casing 12 via the bearings 22A,22B. Further, a small diameter part 34c on the front-end side of the rotating shaft 34 is integrally connected to the impeller 13.

Here, the two bearings 22A,22B are arranged in the vicinity of both ends of the stator 35s in the axial direction of the motor 35, and the rotor 35r of the motor 35 is supported by both sides with respect to the second casing 12 via both bearings 22A,22B so that the resonance of the impeller 13 and the rotating shaft 34 (rotating portion) in a wide rotational speed range up to a high rotational speed (for example, 100,000 rpm) can be effectively prevented.

Further, in the rotating shaft 34, an axial purge gas passage 41 for introducing the purge gas through the shaft into the shaft hole side from the bearings 22A,22B within the interior space 21 is formed, in addition to the purge gas path of the bearing route around the rotating shaft 34. A part of the purge gas passage 41 is formed so as to open radially outward toward the inner peripheral surface side of the bearing 22A on one side close to the impeller 13.

Specifically, a part of the purge gas passage 41 positioned on the front side in the axial direction of the rotating shaft 34 near the impeller 13 has a first groove part that opens concavely and radially outward toward an inner ring 22ir of the bearing 22A, for example, an annular groove part 41g extending in the circumferential direction and a plurality of vertical groove-shaped second groove parts 41a extending from the first groove part 41g toward the side of the shaft hole 11e. The plurality of second groove parts 41a open on an outer peripheral surface 34d of the rotating shaft 34 exposed between the heat-insulated part 37 and the bearing 22A, for example, at equal angular intervals of 90 degrees.

Further, a part of the purge gas passage 41 is configured to include a plurality of radial passages 41b penetrating in the radial direction of the rotating shaft 34 so as to open on the inner bottom surface side of the annular groove part 41g, and a collection passage 41d connected at predetermined angular intervals to the inner end sides of the plurality of radial passages 41b. The collection passage 41d is communicatively connected to the axial passage 41c extending on the rear side of the collection passage 41d in the axial direction of the collection passage 41d.

Although the plurality of radial passages 41b intersect at equal angular intervals of, for example, 90° in the same manner of the plurality of second groove parts 41a, the arrangement angle positions are different by 45° with respect to the plurality of second groove parts 41a, respectively. As shown in FIG. 8, the purge gas supplied radially outward from the collection passage 41d of the purge gas passage 41 through the plurality of radial passages 41b is in direct contact with the entire circumference on the inner peripheral surface side with respect to the inner ring 22ir of the bearing 22A so that the inner ring 22*ir* can be cooled. In the figure, for example, assuming that the arrangement angle positions of the plurality of radial passages 41*b* are 0°, 90°, 180°, and 270°, the arrangement angle positions of the plurality of second groove parts 41*a* are 45°, 135°, 225°, and 315°.

Further, in the same manner as the third embodiment, the embodiment is provided with the purge gas introduction means 16 that opens in the center of the rear end cover part 12*r* of the second casing 12 to mount the purge gas introduction tube 47 extending in the motor rotating shaft direction, and introduces the purge gas into the interior space 21 via the purge gas passage penetrating, for example, the pipe wall or the like of the purge gas introduction tube 47 not shown in detail. The supply pressure of the purge gas described above is set to the extent that the purge gas can flow into the gas passage 11*c* of the first casing 11 via the clearance passage 32 around the rotating shaft 14 in the shaft hole 11*e* at a predetermined flow amount (for example, 1 L (liter)-30 L/min) effective for cooling the bearing 22A when the purge gas (for example, fuel gas at room temperature) is supplied to the interior space 21 of the second casing 12 by the purge gas introduction means 16 and the purge gas is introduced into the gas storage chamber 31 through a plurality of paths inside and outside the rotating shaft 34. A hermetic connector 48 or the like for airtightly pulling out and connecting the wiring of the motor 35 to the outside is mounted on the outer end side of the purge gas introduction tube 47.

Note that, for example, a plurality of O-rings or the like are externally mounted to the rear-side bearing 22B on the outer ring side supported by the second casing 12 to restrict the rotation of the outer ring a core float-shaped support ring 25B in which a lubricant is applied between the O-rings, and further the bearing 22B is urged toward the bearing 22A by a thrust load generating ring 28. Further, the support ring 25A that supports the outer ring of the bearing 22A is abutted in the axial direction with respect to the substantially annular plate-shaped mounting plate 12*f* so as to restrict the forward movement of the bearing 22A, and is prevented from rotating by a positioning pin or the like embedded in the mounting plate 12*f*. Therefore, the rotating shaft 34 is configured so that the large diameter part 34*a* that is one side portion between the bearings 22A,22B and the other side portion 34*e* are positioned axially by the bearings 22A,22B, and the rotating shaft 34 is supported to be freely rotatable in an aligned state.

In the present embodiment, a plurality of vertical groove-shaped second groove parts 41*a*, which are openings on the front-end side of the purge gas passage 41, open on an outer peripheral surface of the intermediate diameter part 34*b* positioned on the front side of the rotating shaft 34, on the front side of the bearing 22A and on the rear end side of the shaft hole 11*e*. The annular groove part 41*g*, which is connected to the second groove parts 41*a*, opens radially outward over the entire circumferential direction of the rotating shaft 34 at a predetermined groove width in the vicinity of the center of the axial length region of the bearing 22A. The plurality of radial passages 41*b* in communication with the annular groove part 41*g* are communicably connected to the axial passage 41*c* on the rear side in the axial direction via the collection passage 41*d*.

Therefore, when the purge gas introduction means 16 operates to supply the purge gas to the interior space 21 of the second casing 12 at a supply pressure according to the rotational speed of the motor 35 during operation of the recirculation blower 5, the purge gas having a predetermined pressure or higher is surely introduced into the shaft hole 11*e* and the gas storage chamber 31 in communication with the clearance 33 on the rear surface side of the impeller 13 through the plurality of paths inside and outside of the rotating shaft 34.

At this time, the purge gas introduced into the purge gas passage 41 directly cools the vicinity of the center of the axial length region of the bearing 22A while the purge gas is supplied between the shaft hole 11*e* and the bearing 22A. Further, the internal gas is continuously replaced by the purge gas, and the purge gas having a predetermined pressure is introduced on the right side in FIG. 1 of the shaft hole 11*e*, so that an effective back pressure is generated to oppose the infiltration of the anode-off gas boosted according to the rotational speed of the impeller 13 into the shaft hole 11*e* and the infiltration thereinto of the anode-off gas having high temperature and humidity is effectively suppressed. Further, in the present embodiment, since the purge gas can be a fuel gas, it is possible to flow the purge gas from the shaft hole 11*e* to the side of the gas passage 11*c* of the first casing 11 at an effective flow amount for cooling the bearing 22A.

As a result, the conventional concern that, depending on the operational state of the recirculation blower 5, a humidified anode-off gas may infiltrate into the shaft hole 11*e* or reduce the bearing performance can be eliminated, the operation and effect can be obtained in the same manner as the first embodiment, and the cooling efficiency on the side of the inner ring 22*ir* of the bearing 22A, which has not been easily cooled, can be remarkably improved.

Fifth Embodiment

FIG. 9 shows a small-size and high-speed blower according to a fifth embodiment of the present invention.

The recirculation blower 5 of the present embodiment is configured to boost and blow the high temperature anode-off gas discharged from the fuel electrode 2*a* of the SOFC 2.

As shown in FIG. 9, the blower 5 of the fifth embodiment is provided with a heat-insulated wall 68 in which the back plate collar member 11*p* and a thick mounting plate 67 are integrally formed on the back surface side of the first casing 11 which stores the impeller 13. The heat-insulated wall 68 is integrally connected to the second casing 12 by a plurality of bolts 17*c*.

The mounting plate 67 of the heat-insulated wall 68 surrounds the rotating shaft 34 with a predetermined radial clearance from the rotating shaft 34 between the back plate collar member 11*p* and the bearing 22A, so that the annular gas storage chamber 31 surrounding the rotating shaft 34 is defined between the shaft hole 11*e* of the first casing 11 and the bearing 22A.

The back plate collar member 11*p* of the heat-insulated part 68 is an airtight wall surface that is positioned at least in the vicinity of the shaft hole 11*e* and has a thermal conductivity lower than that of the second casing 12. Further, in almost the same way of the back plate collar member 11*p* in the first embodiment, the heat-insulated part 68 has a back plate part 11*d* (high temperature side wall surface part) facing the back surface of the impeller 13 with a clearance, a cylindrical part 11*f* (cylindrical wall surface part) forming the shaft hole 11*e*, and a support part 11*h* (low temperature side wall surface part) on which the outer ring of the bearing 22A is abutted and supported.

Further, the heat-insulated wall 68 is provided with at least one purge gas introduction passage 61 having an inlet on the outer end side and extending radially (in a radial direction) from the gas storage chamber 31, and an inner end of the purge gas passage 61 opens in the vicinity of the outer ring abutting part 11h. The purge gas is introduced directly into the gas storage chamber 31 (without passing through the rotating shaft 34) from an external purge gas introduction means 66 through the purge gas introduction passage 61.

In almost the same way of the purge gas introduction means 16 of the first embodiment, the purge gas introduction means 66 introduces a gas having a higher pressure than that in the shaft hole 11e of the first casing 11 through the purge gas introduction passage 61 and the gas storage chamber 31 into the second casing 12, so that when the purge gas is introduced into the gas storage chamber 31, the inflow of the anode-off gas having high temperature and humidity from the side of the gas passage 11c of the first casing 11 into the shaft hole 11e is suppressed.

That is, also in the present embodiment, the purge gas having a predetermined pressure is introduced into the inner side (right side in FIG. 9) of the shaft hole 11e of the first casing 11 so that an effective back pressure is generated to oppose the infiltration of the anode-off gas boosted according to the rotational speed of the impeller 13 into the shaft hole 11e, thereby effectively suppress the infiltration of the anode-off gas having high temperature and humidity. Further, it is also possible to flow the purge gas from the shaft hole 11e into the gas passage 11c of the first casing 11 by using the purge gas that is a fuel gas.

Note that, in the present embodiment, the gas in the interior space 21 can be continuously replaced with the purge gas while the purge gas introduced into the inside of the second casing 12 by the purge gas introduction means 66 via the purge gas introduction passage 61 and the gas storage chamber 31 forms a flow in the opposite direction to that of each of the above-described embodiments. Specifically, the purge gas introduced into the second casing 12 flows in the interior space 21 from the gas storage chamber 31 to the side of the motor 35 through the bearing 22A (a passage that bypasses the bearing 22A, for example, an inclined passage that opens at both ends in both the radial and axial directions of the bearing 22A may be used together), and the purge gas is discharged out from a purge gas passage 62 that also serves as the motor wiring hole of the rear end cover part 12r through a clearance such as periphery of the rotor 35r. Further, at least at the start of use, a purge gas replacement outlet 63 is fully opened until the air in the second casing 12 which is a bearing box is replaced with the purge gas.

Note that in FIG. 9, the rotating shaft 34 is provided with a fastening ring 27 with a brim, which is positioned in the gas storage chamber 31 and fastens and fixes the inner ring of the bearing 22A to the rotating shaft 34. With the fastening ring 27 having a brim, it is possible to effectively guide the flow of the purge gas flowing into the gas storage chamber 31 and generate an effective back pressure to oppose the above-mentioned infiltration of the anode-off gas into the shaft hole 11e.

Also, in this embodiment, the same effect as in each of the above-described embodiments can be obtained.

Note that, in each of the above embodiments, it was described that the blower of the present invention recirculates a SOFC anode-off gas, but as stated above, the blower of the present invention may be used as a blower for boosting an anode-off gas other than a recirculation blower or a blower for boosting a high temperature cathode-off gas. Therefore, the purge gas can make the target gas for blowing as a main component, and can use a so-called inert gas such as nitrogen.

Furthermore, the blower of the present invention can be applied to a hydrogen production system by a Solid Oxide Electrolysis Cell (SOEC) in which a blower which compresses and recirculates a humidified hydrogen gas to a fuel electrode, and can be applied to other blowers which can boost a target gas, and can ensure the uniformity of the temperature inside various heat treatment furnaces and firing furnaces and improve the heating efficiency.

Further, in each of the above-described embodiments, the purge gas supplied at a predetermined supply pressure into the interior space 21 of the second casing 12 is supplied to the gas storage chamber 31 through a plurality of paths including a first supply path (bearing route) around the rotating shaft 14 or 34 integrally coupled with the impeller 13 and a second supply path (shaft hole route) passing through the purge gas passage 41 inside the rotating shaft 14 or 34. However, for example, when the temperature of the bearing 22A to be cooled is not so high, it goes without saying that it is also conceivable to form a vertical groove or a purge gas passage passing through the outer side of the bearings 22A,22B in the support pipes 25A,25B supporting the bearings 22A,22B or the second casing 12 that is a bearing box instead of passing the purge gas through the bearings 22A,22B.

As described above, the present invention can provide a blower which can reliably suppress a gas to be blown from infiltrating into the shaft hole side, and, a small size and cost reduction is simple, and thus, is useful in all blowers suitable for boosting and blowing a gas to be blown from a fuel cell, an electrolytic cell and the like.

REFERENCE SIGNS LIST 1 power generation system
2 SOFC (solid oxide fuel cell)
2a fuel electrode (anode)
2b air electrode (cathode)
3 MGT (micro gas turbine)
4 air blower
5 recirculation blower (blower)
6 combustor
7 inverter
8 gas blower
9 heat exchanger
11 first casing
11a suction port
11b scroll passage
11c gas passage
11d back-plate part (high temperature side surface portion, plate-shaped heat insulating part)
11e shaft hole
11f cylindrical part (cylindrical wall surface portion)
11g support (low temperature side surface portion)
11h support part (low temperature side wall portion)
11p back-plate collar member
11s scroll casing part
12 second casing
12r rear end cover part
13 impeller
14, 34 rotating shaft
14a large diameter part
14b intermediate diameter part
14c small diameter part
14d stepped outer peripheral surface
14r rear end surface
15, 35 motor
15r rotor
15s stator
16 purge gas introduction means
21 interior space 22A,22B bearing
22ir inner ring
23 heatsink
24 cooling fan
31 gas storage chamber (annular gas storage chamber)
32 clearance passage (thin cylindrical clearance passage)
37 disc-shaped heat insulating part (low temperature side surface portion)
41 purge gas passage (part of purge gas passage)
41a front-end side opening (one end portion, second groove part)
41b radial passage (the other portion, plurality of radial passage)
41c axial passage (the other portion)
41d collection passage
41e small diameter passage for cooling
41g annular groove part (first groove part)
42 purge gas introduction passage (remainder of purge gas passage)
47 purge gas introduction tube (remainder of purge gas passage)
48 hermetic connector
61 purge gas introduction passage (purge gas passage)
66 purge gas introduction means
67 mounting plate (low temperature side surface portion)
68 heat insulated wall (heat insulating part)
L1 fuel supply line
L2 air supply line
L3 recirculation line

What is claimed is:

1. A blower provided with a first casing formed by a gas passage for introducing a target gas and a shaft hole in communication with the gas passage, a rotating shaft inserted to be freely rotatable in the shaft hole of the first casing, an impeller housed within the first casing at a front-end side of the rotating shaft and which can rotate integrally with the rotating shaft, a motor which drives the rotating shaft from a rear end side of the rotating shaft, a second casing having an interior space in communication with the shaft hole and supporting the rotating shaft via a bearing, and a purge gas introduction which introduces a purge gas having a higher pressure than a pressure in the shaft hole of the first casing into the interior space of the second casing, wherein the purge gas introduction has a purge gas passage open in a vicinity of a rear end of the shaft hole and connected to an external purge gas supply source, and an inflow of the target gas from a gas passage side of the first casing into the interior space of the second casing is suppressed by introducing the purge gas into a shaft hole side of the interior space by the purge gas passage, and wherein the first casing is provided with a heat insulating part which is a substantially plate-shaped body positioned on a back side of the impeller and penetrated by the rotating shaft, the heat insulating part is provided with a low temperature side surface portion which defines an annular gas storage chamber by surrounding the rotating shaft between the shaft hole of the first casing and the bearing, and a part of the purge gas passage is open into the annular gas storage chamber in the vicinity of the rear end of the shaft hole between the shaft hole and the bearing.

2. The blower according to claim 1, wherein when the purge gas introduction introduces the purge gas into the interior space of the second casing, the purge gas is filled on the shaft hole side from at least the bearing in the interior space while the pressure of the purge gas is maintained at lhg higher pressure than the pressure in the shaft hole.

3. The blower according to claim 1, wherein the target gas is discharged from a fuel electrode side of a fuel cell, and the purge gas comprises at least a fuel component of the fuel cell, wherein when the purge gas is introduced into the interior space of the second casing, the purge gas flows to the gas passage side of the first casing through an annular clearance in a periphery of the rotating shaft in the shaft hole.

4. The blower according to claim 1, wherein
the part of the purge gas passage is open on a bearing side of the heat insulating part.

5. The blower according to claim 4, wherein the heat insulating part has an airtight wall surface having a lower thermal conductivity than the second casing in at least a vicinity of the shaft hole, and the airtight wall surface has a high temperature side wall surface portion facing a back surface of the impeller spaced at a predetermined clearance, a cylindrical wall surface portion which forms the shaft hole, and a low temperature side wall surface portion positioned in a vicinity of the part of the purge gas passage.

6. The blower according to claim 5, wherein
the annular gas storage chamber is defined by a plurality of members comprising at least the heat insulating part, the rotating shaft and the bearing on a rear end side of the shaft hole, and
a clearance passage having a smaller radial clearance dimension than the annular gas storage chamber is formed between the cylindrical wall surface portion of the airtight wall surface of the heat insulating part and the rotating shaft on a shaft hole side of the annular gas storage chamber.

7. The blower according to claim 6, wherein one end side portion of the part of the purge gas passage which is on the rear end side of the shaft hole is on a shaft hole side of the bearing and opens on an outer peripheral surface of the front-end side of the rotating shaft, and another an other portion of the part of the purge gas passage extends to an inner peripheral surface of the front-end side of the rotating shaft.

8. The blower according to claim 6, wherein an other portion of the part of the purge gas passage on the rear end side of the rotating shaft opens on an end surface of the rotating shaft, the end surface extends in a radial direction of the rotating shaft on a radially inward side of the rotating shaft from an outer peripheral surface of the front-end side of the rotating shaft.

9. The blower according to claim 1, wherein the part of the purge gas passage opens radially outward toward an inner peripheral surface of the bearing.

10. The blower according to claim 9, wherein
the part of the purge gas passage comprises a first groove part that opens radially outward toward an inner ring of the bearing and a plurality of second groove parts that extend from the first groove part toward the shaft hole side of the interior space and open on an outer peripheral surface of the rotating shaft between the heat insulating part and the bearing.

11. The blower according to claim 1, wherein the heat insulating part includes a back plate collar member substantially plate-shaped body positioned on the back side of the impeller and penetrated by the rotating shaft, and a mounting plate integrally connected to the back plate collar member and surrounding the rotating shaft with a predetermined radial clearance from the rotating shaft between the back plate collar member and the bearing so as to define the annular gas storage chamber between the shaft hole of the first casing and the bearing, and the part of the purge gas passage, which is on the rear end side of the shaft hole and introduces the purge gas into the annular gas storage chamber in the interior space, is formed in the mounting olate of the heat insulating part.

12. The blower according to claim 11, wherein the heat insulating part has a high temperature side wall surface part facing a back surface of the impeller with a clearance, a cylindrical wall surface part forming the shaft hole, and a low temperature side wall surface part on which an outer ring of the bearing is abutted and supported and which forms the low temperature side surface portion, and the part of the purge gas passage is open into the annular gas storage chamber in the vicinity of the rear end of the shaft hole and the low temperature side wall surface part.

13. The blower according to claim 1, wherein the second casing is cooled by a heatsink and a cooling fan, and wherein the purge gas is a dry seal gas to be introduced by the external purge gas supply source into the annular gas storage chamber through the purge gas passage of the purge gas introduction so as to suppress condensation in a vicinity of the bearing.

14. The blower according to claim 1, wherein the second casing has a plurality of cooling passages formed therein to have the bearing cooled by passing a medium for cooling through the cooling passages, and wherein the purge gas is a dry seal gas to be introduced by the external purge gas supply source into the annular gas storage chamber through the purge gas passage of the purge gas introduction so as to suppress condensation in a vicinity of the bearing.

15. A blower, comprising:
a first casing formed by a gas passage for introducing a target gas and a shaft hole in communication with the gas passage,
a rotating shaft inserted to be freely rotatable in the shaft hole of the first casing,
an impeller housed within the first casing at a front-end side of the rotating shaft and which can rotate integrally with the rotating shaft,
a motor which drives the rotating shaft from a rear end side of the rotating shaft,
a second casing having an interior space in communication with the shaft hole and supporting the rotating shaft via a bearing, and
a purge gas introduction, which introduces a purge gas having a higher pressure than a pressure in the shaft hole of the first casing into the interior space of the second casing, wherein
the purge gas introduction has a purge gas passage open in a vicinity of a rear end of the shaft hole, and
an inflow of the target gas from a gas passage side of the first casing into the interior space of the second casing is suppressed by introducing the purge gas into a shaft hole side of the interior space by the purge gas passage, and wherein
the first casing is provided with a heat insulating part which is a substantially plate-shaped body positioned on a back side of the impeller and penetrated by the rotating shaft,
the heat insulating part defines an annular gas storage chamber by surrounding the rotating shaft between the shaft hole of the first casing and the bearing, and
a part of the purge gas passage is open into the annular gas storage chamber in the vicinity of the rear end of the shaft hole between the shaft hole and the bearing, wherein the part of the purge gas passage opens radially outward toward an inner peripheral surface of the bearing and comprises a first groove part that opens radially outward toward an inner ring of the bearing and a plurality of second groove parts that extend from the first groove part toward the shaft hole side of the interior space and open on an outer peripheral surface of the rotating shaft between the heat insulating part and the bearing.

\* \* \* \* \*

UNITED STATES PATENT AND TRADEMARK OFFICE
CERTIFICATE OF CORRECTION

| | |
|---|---|
| PATENT NO. | : 12,038,018 B2 |
| APPLICATION NO. | : 17/594998 |
| DATED | : July 16, 2024 |
| INVENTOR(S) | : Kimihiko Sato |

It is certified that error appears in the above-identified patent and that said Letters Patent is hereby corrected as shown below:

On the Title Page

Column 1, item (73) under Assignees, Lines 1-2, delete "CAP CO., LTD.; OSAKA BLOWER MFG. CO., LTD." and insert --CAP CO., LTD., Kanagawa (JP); OSAKA BLOWER MFG. CO., LTD., Osaka (JP)--.

In the Specification

In Column 7, Line 56, delete "his" and insert --11s--.

In Column 7, Line 59, delete "his." and insert --11s.--.

In the Claims

In Column 21, Claim 2, Line 66, delete "lhg" and insert --the--.

In Column 23, Claim 11, Line 3, delete "olate" and insert --plate--.

Signed and Sealed this
Fifteenth Day of October, 2024

Katherine Kelly Vidal
*Director of the United States Patent and Trademark Office*